Nov. 30, 1954   W. A. BEDFORD, JR   2,695,434
TRIM FASTENING DEVICE
Filed Nov. 22, 1950
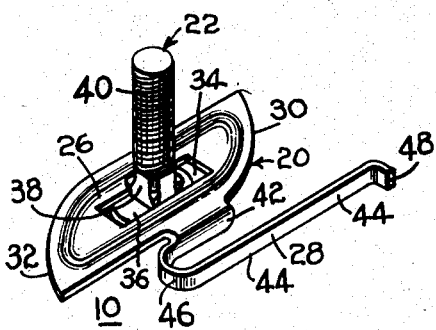
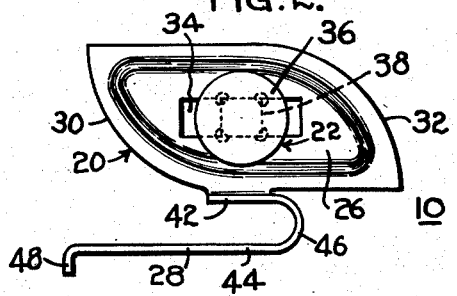
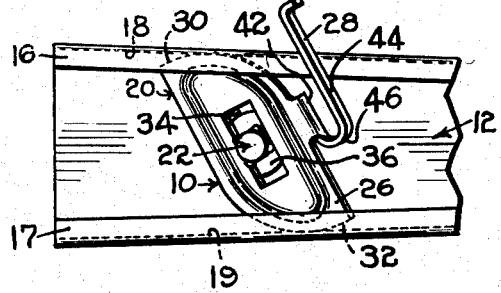
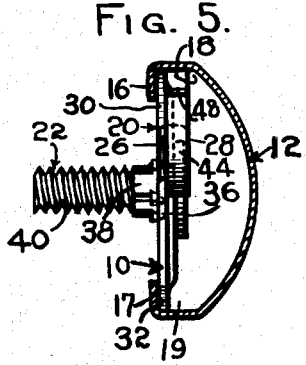
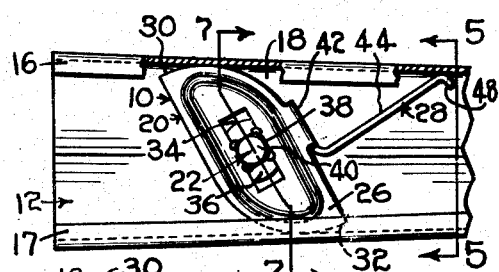
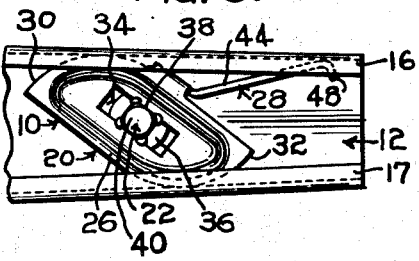
INVENTOR:
WILLIAM A. BEDFORD JR.
By Robert E. Ross
AGENT.

United States Patent Office 2,695,434
Patented Nov. 30, 1954

2,695,434

TRIM FASTENING DEVICE

William A. Bedford, Jr., North Scituate, Mass., assignor to United-Carr Fastener Corporation, Cambridge, Mass., a corporation of Massachusetts Application November 22, 1950, Serial No. 197,052

3 Claims. (Cl. 24—73)

This invention relates generally to fastening devices, and has particular reference to fasteners for attaching moldings, metal trim, and the like to vehicles, aircraft, and other installations.

Moldings for motor vehicles and the like are frequently made of channeled construction of suitable cross-sectional shape and are provided with inwardly extending spaced flanges adapted to be clamped against the vehicle body by the cross-piece of a T-bolt type of fastener. Such fasteners are readily mounted in a desired position by inserting the cross-piece between the spaced flanges and then turning it so that the ends thereof pass behind the flanges to bear against a portion of the molding, so that the cross-piece is maintained in an inclined position in the molding, with the angle of inclination being greater in the more narrow moldings. Since such fasteners are frequently used in tapered moldings whose width varies along the axis of the molding, the cross-piece may be provided with diagonally opposite corners which are rounded to provide a smooth bearing surface at the ends thereof for such moldings of varying widths.

The object of the invention is to provide a molding fastener in which a cross-piece which is adapted to be inserted into a channeled molding and rotated so that the ends thereof pass behind inturned edges of the molding is provided with means for engaging the molding to maintain the cross-piece in the rotated position.

A further object of the invention is to provide a molding fastener in which a molding-engaging portion is provided with a single bearing portion at one end for bearing against an inturned edge of the molding on one side, and spaced bearing portions for bearing against longitudinally spaced portions of an inturned edge of the molding on the opposite side in which said spaced bearing portions are connected by spring means which urges them together to end to increase the height of the molding-engaging portion when the fastener is assembled in the molding.

A still further object of the invention is to provide a molding fastener in which a cross-piece which is adapted to be inserted between inturned edges of a molding and rotated so that the ends thereof bear against said edges is provided with a U-shaped cantilever spring member attached to one side thereof which has one arm of the U attached to the cross-piece and the other arm extending alongside the cross-piece toward one edge of the molding for engagement therewith when the fastener is assembled to maintain the cross-piece in the rotated position.

In the drawing:

Fig. 1 is a perspective view of a molding fastener embodying the features of the invention;

Fig. 2 is a view in elevation of the fastener of Fig. 1;

Fig. 3 is a view in elevation of the fastener of Fig. 1 illustrating the first step in the assembly of the fastener into a channeled molding;

Fig. 4 is a view similar to Fig. 3 in which the fastener is completely assembled with the molding;

Fig. 5 is a view in section taken on line 5—5 of Fig. 4;

Fig. 6 is a view similar to Fig. 4 in which the fastener has been slid into a narrower portion of the molding; and Fig. 7 is a view similar to Fig. 5 taken on line 7—7 of Fig. 4.

Referring to the drawing, there is illustrated a molding fastener 10, which is adapted for assembly with a molding 12, to enable the molding to be attached to a supporting panel 14. The molding with which the fastener is best adapted for use is generally channel shaped, with inturned edges 16 and 17 at opposite sides thereof forming opposing recesses 18 and 19.

The fastener 10 comprises generally a molding-engaging portion 20 and a panel-engaging portion such as a bolt 22 or the like for insertion through an opening 24 in the supporting panel. The molding-engaging portion 20 is particularly adapted for assembly into moldings of various widths, or into a tapered molding in which the width varies throughout the length thereof, and comprises generally a cross-piece 26 and a cantilever spring 28 attached thereto and extending alongside the cross-piece in the plane thereof. The cross-piece 26 has a length which is greater than the width of the molding 12 and a width less than the distance between the inturned edges 16, whereby the cross-piece may be inserted between the inturned edges and rotated until the ends thereof pass into the opposing recesses 18 and bear against the molding, so that the cross-piece is maintained in an inclined position in relation to the axis of the molding (see Fig. 3). The angle of inclination of the cross-piece from the transverse axis of the molding, as measured by a line drawn between the points of contact of the ends thereof with the molding, will vary with the width of the molding, and will be greater with narrower moldings.

To provide a smooth bearing surface for engagement with moldings of various sizes, the ends of the cross-piece are provided with diagonally opposite rounded portions 30 and 32.

A slot 34 is provided centrally in the cross-piece to receive the bolt 22, and the slot 34 is preferably elongated along the major axis of the cross-piece. The bolt 22 is provided with a flat head 36 disposed on one side of the cross-piece, a square shank portion 38 extending through the slot 34, and a threaded shank portion 40 extending therefrom. The bolt is loosely assembled with the cross-piece by staking, that is, by mashing the corners of the square shank portion downwardly to protrude over the adjacent portion of the cross-piece, so that the bolt is retained in the slot but is slidable therein to permit the position of the bolt to be adjusted vertically in relation to the axis of the molding after assembly therewith.

In the illustrated embodiment the spring 28 is integral with the cross-piece, and is generally U-shaped, with a pair of arms 42 and 44 which extend generally in the same direction. The arm 42 is attached to the side of the cross-piece 26 intermediate the ends thereof and extends alongside the cross-piece to a reverse bend portion 46 and then extends alongside the cross-piece in the opposite direction to terminate in a free end portion 48, which is preferably disposed in spaced relation to the rounded bearing portion 30. The spring 28 is movable laterally substantially parallel to the plane of the cross-piece, so that the free end moves toward and away from the bearing portion 30. The moving of the spring 28 in this manner varies the overall height of the molding-engaging portion, that is, the distance between the lower bearing portion 32 and a line connecting the upper bearing portion 30 and the free end portion 48, so that the molding-engaging portion may adjust itself to moldings of various widths. The molding-engaging portion is thus provided with a single bearing portion for bearing against one inturned edge of the molding, and spaced bearing portions for bearing against the opposite inturned edge of the molding, said spaced bearing portions being movable relative to each other with a scissors action, so that the distance therebetween depends on the width of the molding into which the device is inserted, with the distance being greater in the case of smaller moldings.

To assemble the molding-engaging portion into the molding, the cross-piece 26 is inserted between the inturned edges 16 and rotated until the rounded bearing portions 30 and 32 pass into the opposing recesses 18 and 19 respectively and engage the opposite sides of the molding (see Fig. 3). The spring 28 is then moved laterally away from the cross-piece until the free end 48 is able to pass under the adjacent inturned edge and snap into the recess 18 in spaced relation longitudinally of the molding to the rounded bearing portion 30 of the cross-piece (see Fig. 4). During such outward movement of the spring arm, the flexing and deformation of the arm occurs mainly about a fulcrum point at the reverse bend portion 46 (compare Fig. 3 with Figs. 4 and 6). After such assembly, the spring and the cross-piece tend to close with a scissors action, which tends to increase the overall height of the molding-engaging portion, to securely retain it in engagement with the molding.

When the fastener is assembled into a tapered molding, it may easily be slid longitudinally therein to properly position the bolt 22 for entering the opening 24 in the supporting panel. For example, when the molding-engaging portion is slid longitudinally into a smaller portion of the molding, as illustrated in Fig. 6, the cross-piece rotates to increase the angle of inclination thereof to the transverse axis of the molding, and the spring 28 flexes further outwardly away from the cross-piece, increasing the distance between the free end 48 of the spring and the upper rounded bearing portion 30.

The fastener is not only adapted for use with tapered moldings, but may also be used in moldings of uniform width, and has the further advantage that only one size of molding fastener is required to be manufactured and stocked for use with many different sizes of moldings.

Since certain obvious modifications may be made in the device without departing from the scope of the invention, it is intended that all matter contained herein be interpreted in an illustrative and not in a limiting sense.

I claim:

1. A fastening device for assembly with a strip of molding or the like having inturned flanges along the side edges forming opposing recesses, said device comprising a cross-plate adapted to be inserted between the inturned edges and rotated so that end portions thereof pass into said recesses, and a spring arm having an end joined to the cross-plate intermediate the ends thereof, said spring arm having a free end extending alongside said cross-plate and generally in the direction of one end thereof, and a portion adjacent the junction with the plate which extends in a direction generally opposite the direction of the free end portion, said two arm portions being joined by a reverse bend portion, said free end portion being flexible away from the cross-plate for engagement with an inturned edge of the molding to rotatably urge said cross-plate into engagement with the molding in the opposing recesses.

2. A fastening device for assembly with a strip of molding or the like having inturned flanges along the side edges thereof forming opposing recesses, said device comprising an elongated cross plate for spanning the distance between the inturned edges, said cross plate having substantially similar eccentric arcuate end portions progressing outwardly in the same direction of hand from root to terminal tip portions, and adapted to enter the opposed recesses, said cross plate having side edges joining said arcuate end portions root to tip, and a spring arm having one end attached to the cross plate intermediate the ends thereof, said spring arm having a free end portion alongside one of the side edges thereof and terminating in lateral spaced relation to an end portion of the plate.

3. A fastening device for assembly with a strip of molding or the like having inturned flanges along the side edges thereof forming opposing recesses, said device comprising an elongated cross plate for spanning the distance between the inturned edges, said cross plate having substantially similar eccentric arcuate end portions progressing outwardly in the same direction of hand from root to terminal tip portions, and adapted to enter the opposed recesses, said cross plate having side edges joining said arcuate end portions root to tip, said cross plate having its central portion in a raised plane, and a spring arm having one end attached to the cross plate intermediate the ends thereof by means of a tab portion, said raised central portion of said cross plate and said tab extending in the same direction from the plane of the peripheral portion of said plate, said spring arm having a free end portion extending alongside one of the side edges thereof and terminating in lateral spaced relation to an end portion of the plate.

References Cited in the file of this patent

UNITED STATES PATENTS

| Number | Name | Date |
| --- | --- | --- |
| 1,577,292 | Obreiter | Mar. 16, 1926 |
| 1,682,532 | Maise | Aug. 28, 1928 |
| 2,084,559 | Jones | June 22, 1937 |
| 2,254,310 | Place | Sept. 2, 1941 |
| 2,515,895 | Poupitch | July 18, 1950 |
| 2,531,351 | Churchill | Nov. 21, 1950 |